US012686735B2

(12) United States Patent
Noguchi et al.

(10) Patent No.: US 12,686,735 B2
(45) Date of Patent: Jul. 21, 2026

(54) POLYMER, FLAME-RETARDANT COMPOSITION, AND METHOD OF PRODUCING POLYMER

(71) Applicant: KURARAY CO., LTD., Okayama (JP)

(72) Inventors: Daiki Noguchi, Kurashiki (JP); Yuki Sasaki, Tainai (JP); Takashi Fukumoto, Tainai (JP)

(73) Assignee: KURARAY CO., LTD., Okayama (JP)

( * ) Notice: Subject to any disclaimer, the term of this patent is extended or adjusted under 35 U.S.C. 154(b) by 499 days.

(21) Appl. No.: 18/037,438

(22) PCT Filed: Nov. 17, 2021

(86) PCT No.: PCT/JP2021/042344

§ 371 (c)(1),
(2) Date: May 17, 2023

(87) PCT Pub. No.: WO2022/107832

PCT Pub. Date: May 27, 2022

(65) Prior Publication Data

US 2023/0406981 A1 Dec. 21, 2023

(30) Foreign Application Priority Data

Nov. 20, 2020 (JP) ................................ 2020-193630

(51) Int. Cl.

| | |
|---|---|
| ***C08F 230/02*** | (2006.01) |
| ***C08F 2/44*** | (2006.01) |
| ***C08F 220/14*** | (2006.01) |
| ***C08F 220/18*** | (2006.01) |
| ***C08J 5/18*** | (2006.01) |
| ***C08K 5/5317*** | (2006.01) |
| ***C08L 43/02*** | (2006.01) |

(52) U.S. Cl.

CPC .............. *C08F 230/02* (2013.01); *C08F 2/44* (2013.01); *C08F 220/14* (2013.01); *C08F 220/1804* (2020.02); *C08J 5/18* (2013.01); *C08K 5/5317* (2013.01); *C08L 43/02* (2013.01); *C08L 2201/02* (2013.01)

(58) Field of Classification Search

None

See application file for complete search history.

(56) References Cited

U.S. PATENT DOCUMENTS

| | | | | |
|---|---|---|---|---|
| 6,348,612 | B1 | 2/2002 | Burkart et al. | |
| 2009/0305018 | A1* | 12/2009 | Ohtaki | B32B 27/32 428/220 |
| 2013/0237650 | A1* | 9/2013 | Chung | C08L 69/00 525/149 |
| 2015/0005410 | A1* | 1/2015 | Kang | C08F 212/10 526/275 |
| 2016/0002380 | A1* | 1/2016 | Abe | C08F 220/14 526/274 |

FOREIGN PATENT DOCUMENTS

| | | | | |
|---|---|---|---|---|
| CN | 1193020 | A | | 9/1998 |
| EP | 3 521 364 | A1 | | 8/2019 |
| EP | 3 564 247 | A1 | | 11/2019 |
| JP | 08-137064 | A | | 5/1996 |
| JP | 10-025146 | A | | 1/1998 |
| JP | 2000-007687 | A | | 1/2000 |
| JP | 2007-177203 | A | | 7/2007 |
| JP | 2010107624 | A | * | 5/2010 |
| JP | 2015074740 | A | * | 4/2015 |
| WO | 2018/062475 | A1 | | 4/2018 |
| WO | 2018/124205 | A1 | | 7/2018 |

OTHER PUBLICATIONS

Mizutani translation (Year: 2010).*

Translation of JP 2015-074740 (Year: 2015).*

Official communication issued in EP Patent Application No. 21894705.9, Oct. 4, 2024.

ISR issued in International Patent Application No. PCT/JP2021/042344, Jan. 18, 2022, translation.

Written Opinion issued in Int'l Patent Application No. PCT/JP2021/042344, Jan. 18, 2022, translation.

* cited by examiner

*Primary Examiner* — Katarzyna I Kolb

(74) *Attorney, Agent, or Firm* — GREENBLUM & BERNSTEIN, P.L.C.

(57) ABSTRACT

A polymer having a structural unit represented by the following general formula (I), a flame-retardant composition comprising the polymer, and a method for producing the polymer.

(I)

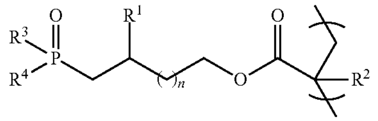

In the general formula (I), $R^1$ represents any one selected from the group consisting of an alkyl group having 1 to 18 carbon atoms, an alkenyl group having 2 to 18 carbon atoms, and an aralkyl group having 7 to 18 carbon atoms; $R^2$ represents a hydrogen atom or a methyl group; $R^3$ and $R^4$ each independently represent any one selected from the group consisting of an alkyl group having 1 to 6 carbon atoms, an alkyloxy group having 1 to 6 carbon atoms, an alkenyl group having 2 to 6 carbon atoms, an alkenyloxy group having 2 to 6 carbon atoms, an aralkyl group having 7 to 12 carbon atoms, an aralkyloxy group having 7 to 12 carbon atoms, an aryl group having 6 to 12 carbon atoms, and an aryloxy group having 6 to 12 carbon atoms, and $R^3$ and $R^4$ may be bonded to each other; and n is an integer of 0 to 5.

8 Claims, No Drawings

POLYMER, FLAME-RETARDANT COMPOSITION, AND METHOD OF PRODUCING POLYMER

TECHNICAL FIELD

The present invention relates to a polymer comprising a specific phosphorus-containing structural unit, a flame-retardant composition comprising the polymer, and a method for producing the polymer.

BACKGROUND ART

A resin comprising methyl methacrylate (MMA) as a main component is excellent in characteristics such as high transparency and weather resistance, and is used for various applications. In recent years, the application of the resin to building materials and the like utilizing transparency and design property has been promoted, but high flame retardancy is required in these applications.

As a method of imparting flame retardancy, for example, methods as described in PTLs 1 and 2 have been studied. Specifically, PTL 1 discloses a methacrylic resin composition obtained by polymerizing a polymerizable composition comprising a monomer composition, a phosphoric acid ester, and an antioxidant, and describes a halogenated phosphoric acid ester and the like as the phosphoric acid ester. Moreover, PTL 2 discloses a flame-retardant acrylic artificial marble obtained by curing a composition comprising a resin component, an inorganic filler, a crosslinkable vinyl monomer, and an acrylic acid ester and/or a crosslinkable vinyl monomer, and describes aluminum hydroxide and the like as the inorganic filler.

CITATION LIST

Patent Literature

PTL 1: JP 2015-074740 A
PTL 2: JP H10-025146 A

SUMMARY OF INVENTION

Technical Problem

In PTL 1, a halogen-containing compound is used, but there are problems that dehalogenation is desired from the viewpoint of environmental load and the like, and that a toxic gas is generated at the time of combustion. Further, when an inorganic flame retardant is added as in PTL 2, there is a problem that turbidity is generated and transparency is lost. Furthermore, when a large amount of flame retardant is added in order to improve flame retardancy, the performance of the cast plate itself is deteriorated, and further, since a resin softens during combustion, there is a problem of inducing ignition to the surroundings.

Therefore, an object of the present invention is to provide a polymer which is excellent in flame retardancy and is less likely to cause deterioration in physical properties such as softening at the time of heating, a flame-retardant composition, and a method for producing the polymer.

Solution to Problem

As a result of intensive studies in order to solve the above-described problems, the present inventors have found that when a polymer comprises a specific phosphorus-containing structural unit, the polymer has excellent flame retardancy and is less likely to cause a decrease in physical properties such as softening at the time of heating, and have thus completed the present invention.

That is, the present invention provides the following [1] to [12].

[1] A polymer including a structural unit represented by the following general formula (I).

(I)

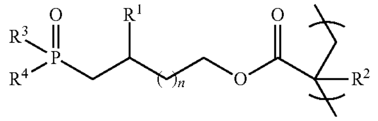

In the general formula (I), $R^1$ represents any one selected from the group consisting of an alkyl group having 1 to 18 carbon atoms, an alkenyl group having 2 to 18 carbon atoms, and an aralkyl group having 7 to 18 carbon atoms; $R^2$ represents a hydrogen atom or a methyl group; $R^3$ and $R^4$ each independently represent any one selected from the group consisting of an alkyl group having 1 to 6 carbon atoms, an alkyloxy group having 1 to 6 carbon atoms, an alkenyl group having 2 to 6 carbon atoms, an alkenyloxy group having 2 to 6 carbon atoms, an aralkyl group having 7 to 12 carbon atoms, an aralkyloxy group having 7 to 12 carbon atoms, an aryl group having 6 to 12 carbon atoms, and an aryloxy group having 6 to 12 carbon atoms, and $R^3$ and $R^4$ may be bonded to each other; and n is an integer of 0 to 5.

[2] The polymer as set forth in [1], wherein $R^1$ in the general formula (I) is a methyl group.

[3] The polymer as set forth in [1] or [2], wherein n in the general formula (I) is 1.

[4] A compound represented by the following general formula (II).

(II)

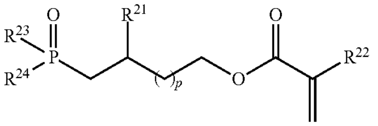

In the general formula (II), $R^{21}$ represents any one selected from the group consisting of an alkyl group having 1 to 18 carbon atoms, an alkenyl group having 2 to 18 carbon atoms, and an aralkyl group having 7 to 18 carbon atoms; $R^{22}$ represents a hydrogen atom or a methyl group; $R^{23}$ and $R^{24}$ each independently represent any one selected from the group consisting of an alkyl group having 1 to 6 carbon atoms, an alkyloxy group having 1 to 6 carbon atoms, an alkenyl group having 2 to 6 carbon atoms, an alkenyloxy group having 2 to 6 carbon atoms, an aralkyl group having 7 to 12 carbon atoms, an aralkyloxy group having 7 to 12 carbon atoms, an aryl group having 6 to 12 carbon atoms, and an aryloxy group having 6 to 12 carbon atoms, and $R^{23}$ and $R^{24}$ may be bonded to each other; and p is an integer of 0 to 5.

[5] The compound as set forth in [4], wherein $R^{21}$ in the general formula (II) is a methyl group, and p is 1.

[6] A flame-retardant composition comprising the polymer as set forth in any of [1] to [3].

[7] A flame-retardant sheet or flame-retardant plate obtained by using the polymer as set forth in any of [1] to [3] or the flame-retardant composition as set forth in [6].

[8] A method for producing a polymer, including a step of polymerizing a compound (A1) represented by the following general formula (III) and a polymerizable monomer (B) in the presence of at least one phosphorous acid-based ester compound (C) selected from the group consisting of a phosphinous acid ester compound, a phosphonous acid monoester compound, and a phosphorous acid diester compound.

(III)

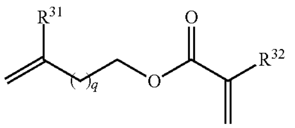

In the general formula (III), $R^{31}$ represents any one selected from the group consisting of an alkyl group having 1 to 18 carbon atoms, an alkenyl group having 2 to 18 carbon atoms, and an aralkyl group having 7 to 18 carbon atoms, $R^{32}$ represents a hydrogen atom or a methyl group, and q is an integer of 0 to 5.

[9] The method for producing a polymer as set forth in [8], wherein q in the general formula (III) is 0 or 1.

[10] The method for producing a polymer as set forth in [8] or [9], wherein an addition amount of the phosphorous acid-based ester compound (C) is 40 to 160 mol % with respect to 100 mol % of the compound (A1).

[11] A composition comprising a compound (A1) represented by the following general formula (III), a polymerizable monomer (B), and at least one phosphorous acid-based ester compound (C) selected from the group consisting of a phosphinous acid ester compound, a phosphonous acid monoester compound, and a phosphorous acid diester compound.

(III)

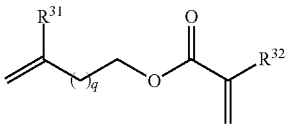

In the general formula (III), $R^{31}$ represents any one selected from the group consisting of an alkyl group having 1 to 18 carbon atoms, an alkenyl group having 2 to 18 carbon atoms, and an aralkyl group having 7 to 18 carbon atoms, $R^{32}$ represents a hydrogen atom or a methyl group, and q is an integer of 0 to 5.

[12] The composition as set forth in [11], wherein a content of the phosphorous acid-based ester compound (C) is 40 to 160 mol % with respect to 100 mol % of the compound (A1).

Advantageous Effects of Invention

According to the present invention, it is possible to provide a polymer which is excellent in flame retardancy and hardly causes deterioration in physical properties such as softening at the time of heating, a flame-retardant composition, and a method for producing the polymer.

DESCRIPTION OF EMBODIMENTS

Hereinafter, an example of an embodiment of the present invention (hereinafter, may be referred to as "the present embodiment") will be described. However, the embodiments described below are examples for embodying the technical idea of the present invention, and the present invention is not limited to the following description.

In addition, in the description herein, preferred embodiments are shown, but a combination of two or more of individual preferred embodiments is also a preferred embodiment. Regarding the matters indicated by the numerical ranges, in a case where there are several numerical ranges, it is possible to selectively combine the lower limit value and the upper limit value thereof to obtain a preferred embodiment.

Moreover, in the description herein, when there is a description of a numerical range of "XX to YY", it means "XX or more and YY or less". Further, in the description herein, "(meth)acrylate" means methacrylate and acrylate.

Since the polymer of the present embodiment comprises a specific phosphorus-containing structural unit, the polymer is excellent in flame retardancy and can suppress deterioration in physical properties such as softening at the time of heating.

The flame-retardant composition comprising the polymer has a low combustion rate and almost no combustion drips. Further, by using the polymer or the flame-retardant composition, it is possible to provide a flame-retardant sheet or a flame-retardant plate having excellent flame retardancy.

In addition, the polymer can be easily obtained by employing a specific step included in the method for producing a polymer. Then, by employing the compound represented by the general formula (II), it is possible to exhibit good performance with respect to flame retardancy.

<Polymer>

The polymer of the present embodiment comprises a structural unit represented by the following general formula (I).

(I)

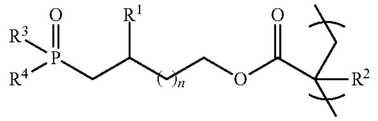

The reason why the polymer of the present embodiment improves the flame retardancy is not clear, but it is considered that one of the reasons is that the polymer contains a large amount of phosphorus-carbon bonds consumable of a large amount of oxygen at the time of combustion, and thus the flame retardancy is improved.

In the general formula (I), $R^1$ represents any one selected from the group consisting of an alkyl group having 1 to 18 carbon atoms, an alkenyl group having 2 to 18 carbon atoms, and an aralkyl group having 7 to 18 carbon atoms.

In the general formula (I), the alkyl group having 1 to 18 carbon atoms represented by $R^1$ is preferably an alkyl group having 1 to 6 carbon atoms from the viewpoint of improving the physical properties of the obtained polymer. Examples of the alkyl group having 1 to 6 carbon atoms include a methyl group, an ethyl group, a n-propyl group, an isopropyl group, a n-butyl group, an isobutyl group, a sec-butyl group, a tert-butyl group, a n-pentyl group, an isopentyl group, a neopentyl group, a n-hexyl group, a cyclopropyl group, a cyclobutyl group, a cyclopentyl group, and a cyclohexyl group. More preferably, it is an alkyl group having 1 to 3 carbon atoms, and still more preferably, it is a methyl group.

In the general formula (I), the alkenyl group having 2 to 18 carbon atoms represented by $R^1$ is preferably an alkenyl group having 2 to 10 carbon atoms, and more preferably an alkenyl group having 2 to 6 carbon atoms, from the viewpoint of improving the physical properties of the obtained polymer. Examples of the alkenyl group having 2 to 6 carbon atoms include a vinyl group, an allyl group, a propenyl group, an isopropenyl group, a butenyl group, an isobutenyl group, a pentenyl group, a hexenyl group (such as a cis-3-hexenyl group), and a cyclohexenyl group.

In the general formula (I), the aralkyl group having 7 to 18 carbon atoms represented by $R^1$ is preferably an aralkyl group having 7 to 14 carbon atoms. Examples of the aralkyl group having 7 to 14 carbon atoms include a benzyl group, a 2-phenylethyl group, a 2-naphthylethyl group, and a diphenylmethyl group.

In the general formula (I), $R^2$ represents a hydrogen atom or a methyl group, and from the viewpoint of polymerization operability, a methyl group is preferable.

In the general formula (I), $R^3$ and $R^4$ each independently represent any one selected from the group consisting of an alkyl group having 1 to 6 carbon atoms, an alkyloxy group having 1 to 6 carbon atoms, an alkenyl group having 2 to 6 carbon atoms, an alkenyloxy group having 2 to 6 carbon atoms, an aralkyl group having 7 to 12 carbon atoms, an aralkyloxy group having 7 to 12 carbon atoms, an aryl group having 6 to 12 carbon atoms, and an aryloxy group having 6 to 12 carbon atoms. $R^3$ and $R^4$ may be bonded to each other.

In the general formula (I), examples of the alkyl group having 1 to 6 carbon atoms represented by $R^3$ and $R^4$ include a methyl group, an ethyl group, a n-propyl group, an isopropyl group, a n-butyl group, an isobutyl group, a sec-butyl group, a tert-butyl group, a n-pentyl group, an isopentyl group, a neopentyl group, a n-hexyl group, a cyclopropyl group, a cyclobutyl group, a cyclopentyl group, and a cyclohexyl group.

In the general formula (I), examples of the alkyloxy group having 1 to 6 carbon atoms represented by $R^3$ and $R^4$ include a methoxy group, an ethoxy group, a n-propyloxy group, an isopropyloxy group, a n-butyloxy group, an isobutyloxy group, a sec-butyloxy group, a tert-butyloxy group, a n-pentyloxy group, an isopentyloxy group, a neopentyloxy group, a n-hexyloxy group, a cyclopropyloxy group, a cyclobutyloxy group, a cyclopentyloxy group, and a cyclohexyloxy group.

In the general formula (I), examples of the alkenyl group having 2 to 6 carbon atoms represented by $R^3$ and $R^4$ include a vinyl group, an allyl group, a propenyl group, an isopropenyl group, a butenyl group, an isobutenyl group, a pentenyl group, a hexenyl group (such as a cis-3-hexenyl group), and a cyclohexenyl group.

In the general formula (I), examples of the alkenyloxy group having 2 to 6 carbon atoms represented by $R^3$ and $R^4$ include a vinyloxy group, an allyloxy group, a propenyloxy group, an isopropenyloxy group, a butenyloxy group, an isobutenyloxy group, a pentenyloxy group, a hexenyloxy group (such as a cis-3-hexenyloxy group), and a cyclohexenyloxy group.

In the general formula (I), examples of the aralkyl group having 7 to 12 carbon atoms represented by $R^3$ and $R^4$ include a benzyl group, a 2-phenylethyl group, and a 2-phenylpropyl group.

In the general formula (I), examples of the aralkyloxy group having 7 to 12 carbon atoms represented by $R^3$ and $R^4$ include a benzyloxy group, a 2-phenylethyloxy group, and a 2-phenylpropyloxy group.

In the general formula (I), examples of the aryl group having 6 to 12 carbon atoms represented by $R^3$ and $R^4$ include a phenyl group, a 2-methylphenyl group, a 2,4-dimethylphenyl group, and a 2-naphthyl group.

In the general formula (I), examples of the aryloxy group having 6 to 12 carbon atoms represented by $R^3$ and $R^4$ include a phenoxy group, a 2-methylphenoxy group, a 2,4-dimethylphenoxy group, and a 2-naphthoxy group.

Among these, from the viewpoint of improving the flame retardancy, $R^3$ and $R^4$ are preferably an ethoxy group, a n-butyloxy group, a phenoxy group, and a phenyl group, and more preferably an ethoxy group and a n-butyloxy group.

In the general formula (I), examples of the structure of the phosphorus atom-containing portion including $R^3$ and $R^4$ include the following structures.

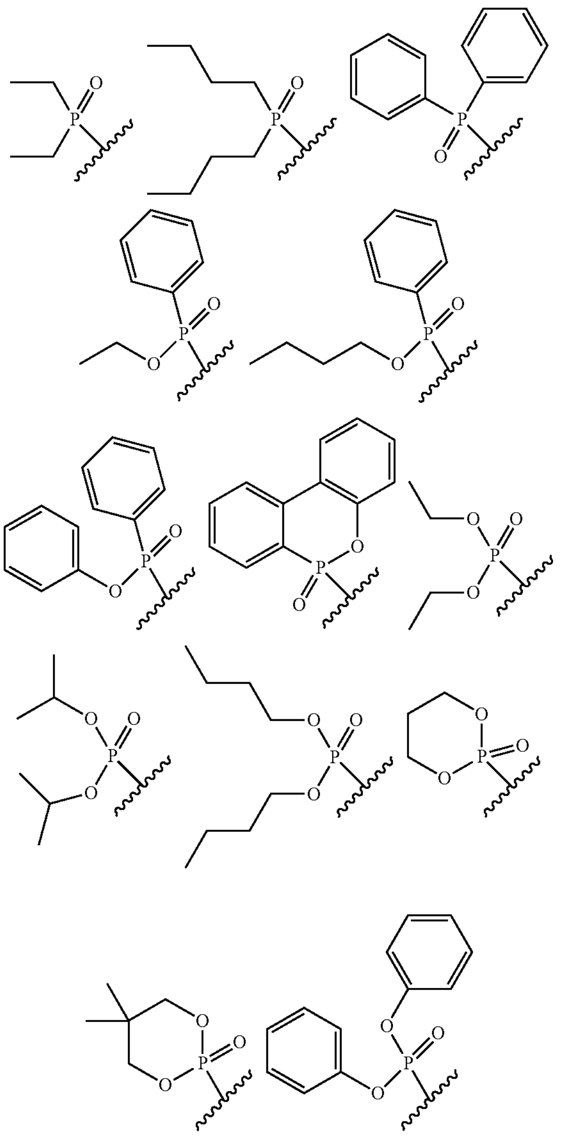

-continued

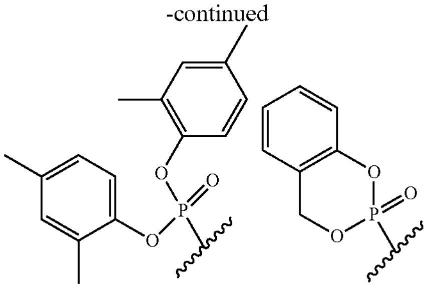

Among these, from the viewpoint of improving the flame retardancy of the obtained polymer and flame-retardant composition, the structure of the phosphorus atom-containing portion including $R^3$ and $R^4$ preferably has the following structure.

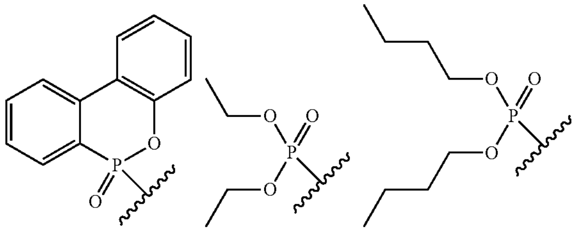

In the general formula (I), n is an arbitrary integer of 0 to 5, and from the viewpoint of improving the physical properties at the time of heating of the obtained polymer and the flame-retardant composition, n is preferably 0 or 1, and more preferably 1.

The content of the structural unit represented by the general formula (I) in the polymer of the present embodiment is preferably 1 to 99% by mass, more preferably 5 to 80% by mass, still more preferably 10 to 70% by mass, even more preferably 10 to 60% by mass, and may be 40 to 60% by mass. When the content of the structural unit represented by the general formula (I) is within the above range, deterioration in physical properties such as softening at the time of heating can be further easily suppressed while improving flame retardancy.

(Polymerizable Monomer (B))

The polymer of the present embodiment can comprise a structural unit other than the structural unit represented by the general formula (I). For example, by including a structural unit derived from the polymerizable monomer (B), the polymer can express a decorative property or the like.

Examples of the polymerizable monomer (B) include vinyl monomers, (meth)acrylic acid alkyl esters, (meth) acrylic acid esters, (meth)acrylates, and unsaturated dicarboxylic acids. As the (meth)acrylic acid ester, for example, those having a cyclic structure, a hydroxy group, or an epoxy group at a terminal can be used. In addition, as the (meth) acrylate, for example, those having an alkylene glycol structure or a silane or silyl group at a terminal can be used.

Examples of the vinyl monomer include styrene, 2-methylstyrene, vinyl acetate, and vinyl chloride.

Examples of the (meth)acrylic acid alkyl ester include methyl (meth)acrylate, propyl (meth)acrylate, butyl(meth) acrylate, pentyl(meth) acrylate, hexyl (meth)acrylate, and 2-ethylhexyl (meth)acrylate.

Examples of the (meth)acrylic acid ester having a cyclic structure include cyclohexyl (meth) acrylate, dicyclopentanyl (meth) acrylate, dicyclopentenyl (meth)acrylate, dicyclopentenyloxyethyl (meth) acrylate, adamantyl (meth)acrylate, 3-hydroxyadamantyl (meth) acrylate, and 2-methyl-2-adamantyl (meth)acrylate.

Examples of the (meth)acrylic acid ester having a hydroxy group include 2-hydroxyethyl (meth) acrylate, hydroxypropyl (meth)acrylate, hydroxybutyl(meth)acrylate, and caprolactone-modified 2-hydroxyethyl (meth)acrylate.

Examples of the (meth)acrylic acid ester having an epoxy group at a terminal include glycidyl (meth)acrylate and (3,4-epoxycyclohexyl)methyl (meth)acrylate.

Examples of the (meth)acrylate having an alkylene glycol structure include methoxydiethylene glycol (meth) acrylate, ethoxydiethylene glycol (meth) acrylate, isooctyloxydiethylene glycol (meth) acrylate, phenoxytriethylene glycol (meth)acrylate, methoxytriethylene glycol (meth) acrylate, and methoxypolyethylene glycol (meth)acrylate.

Examples of the silane- or silyl group-terminated (meth) acrylate include 2-trimethylsiloxyethyl (meth)acrylate.

Examples of the unsaturated dicarboxylic acid include maleic anhydride and derivatives thereof.

In addition, as the polymerizable monomer (B), a compound having two or more polymerizable groups in the molecule (excluding the compound (A1) described later) may be used. Examples of the compound having two or more polymerizable groups in the molecule include 2-propenyl (meth)acrylate, ethylene glycol di(meth)acrylate, diethylene glycol di(meth)acrylate, dipropylene glycol di(meth)acrylate, tripropylene glycol di(meth)acrylate, 1,3-butanediol di(meth)acrylate, 1,4-butanediol di(meth)acrylate, 1,6-hexanediol di(meth)acrylate, neopentyl glycol di(meth)acrylate, 1,9-nonanediol di(meth)acrylate, 1,10-decanediol di(meth)acrylate, tricyclodecane dimethanol di(meth)acrylate, glycerol di(meth)acrylate, di(meth)acrylate of hydrogenated bisphenol A or hydrogenated bisphenol F, polyethylene glycol di(meth)acrylate, polypropylene glycol di(meth)acrylate, pentaerythritol tetra(meth)acrylate, dipentaerythritol hexa(meth)acrylate, and trimethylolpropane tri(meth)acrylate.

Further, as the polymerizable monomer (B), a hydroxy group-containing polyfunctional (meth)acrylic acid ester may be used. Examples of the hydroxy group-containing polyfunctional (meth)acrylic acid ester include glycerol di(meth)acrylate, trimethylolpropane di(meth)acrylate, pentaerythritol tri(meth)acrylate, pentaerythritol di(meth)acrylate, and dipentaerythritol monohydroxypenta(meth) acrylate.

Among these polymerizable monomers (B), from the viewpoint of processability and decorative property, methyl (meth)acrylate and butyl(meth)acrylate are preferable and methyl methacrylate (that is, methacrylic acid methyl ester) is more preferable. These polymerizable monomers (B) may be used alone, or two or more thereof may be used in combination.

The content of the structural unit derived from the polymerizable monomer (B) in the polymer of the present embodiment is not particularly limited, but is preferably 1 to 99% by mass, more preferably 20 to 95% by mass, still more preferably 30 to 90% by mass, even more preferably 40 to 90% by mass, and may be 40 to 60% by mass. When the content of the structural unit derived from the polymerizable monomer (B) is within the above range, the processability and the decorative property of the polymer can be improved while improving the flame retardancy.

The polymerizable monomer (B) may be polymerized to some extent before being mixed with other components and then used as a syrup for the purpose of improving the operability and shortening the polymerization time. This operation may be applied to all parts of the polymerizable monomer (B), or may be applied to only a part of the polymerizable monomer (B).

<Method for Producing Polymer (1)>

The polymer of the present embodiment can be produced by applying a known polymerization method such as cationic polymerization, anionic polymerization, or radical polymerization to a polymerizable monomer formable of a structural unit represented by the general formula (I).

(Compound (A))

As a polymerizable monomer formable of the structural unit represented by the general formula (I), a compound (A) represented by the following general formula (II) may be used. For example, a method (1) for producing a polymer, in which a raw material composition comprising the compound (A) and the polymerizable monomer (B) as an optional component is polymerized by the above-described known polymerization method, can be employed.

By using the compound (A), a polymer comprising a structural unit represented by the general formula (I) can be obtained, and a large amount of phosphorus atoms can be contained in the molecular structure of the polymer. Therefore, elution, bleeding (also referred to as bleed out), and the like of a phosphorus-containing component due to heating do not occur, and good performance can be maintained.

(II)

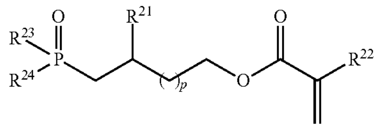

In the general formula (II), $R^{21}$, $R^{22}$, $R^{23}$, and $R^{24}$ are the same as $R^1$, $R^2$, $R^3$, and $R^4$ in the general formula (I), respectively, and redundant description is omitted here.

Preferred embodiments of $R^{21}$, $R^{21}$, $R^{22}$, $R^{23}$, and $R^{24}$ are also the same as those of $R^1$, $R^2$, $R^3$, and $R^4$ in the general formula (I), respectively, and redundant description is omitted here.

In the general formula (II), p is an arbitrary integer of 0 to 5, and from the viewpoint of improving the physical properties at the time of heating of the obtained polymer and the flame-retardant composition, p is preferably 0 or 1, and more preferably 1.

The compound (A) can be synthesized, for example, by utilizing and applying known chemical reactions.

In the method (1) for producing a polymer, the addition amount of the compound (A) is not particularly limited, but from the viewpoint of improving the flame retardancy of the flame-retardant composition described later, when the total amount of the raw materials is 100 parts by mass, it is preferably 0.1 parts by mass or more, more preferably 1.0 parts by mass or more, and still more preferably 5.0 parts by mass or more. Whereas from the viewpoint of moldability, when the total amount of the raw materials is 100 parts by mass, the upper limit of the addition amount of the compound (A) is preferably 50 parts by mass or less, more preferably 30 parts by mass or less, and may be 20 parts by mass or less.

<Method for Producing Polymer (2)>

The method for producing a polymer of the present embodiment can be, besides the method (1) for producing a polymer described above, a production method (2) including a step of polymerizing a compound (A1) represented by the general formula (III) and a polymerizable monomer (B) in the presence of at least one phosphorous acid-based ester compound (C) selected from the group consisting of a phosphinous acid ester compound, a phosphonous acid monoester compound, and a phosphorous acid diester compound.

As described above, the polymer of the present embodiment can be produced by applying a known polymerization method to a raw material composition comprising the compound (A). On the other hand, by employing the method (2) for producing a polymer, a polymer can be obtained without requiring a multi-step process. Further, it is also possible to obtain a molded body by forming a composition (raw material composition) comprising a compound (A1) represented by the general formula (III), a polymerizable monomer (B), and at least one phosphorous acid-based ester compound (C) selected from the group consisting of a phosphinous acid ester compound, a phosphonous acid monoester compound, and a phosphorous acid diester compound, and then injecting the raw material composition into a mold to polymerize and cure the raw material composition.

(Compound (A1))

The compound (A1) is represented by the following general formula (III).

(III)

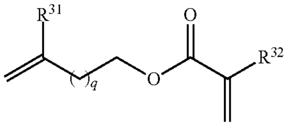

In the general formula (III), $R^{31}$ and $R^{32}$ are the same as $R^1$ and $R^2$ in the general formula (I), respectively, and redundant description is omitted here.

$R^{31}$ is preferably a methyl group from the viewpoint of polymerization operability.

$R^{32}$ represents a hydrogen atom or a methyl group, and from the viewpoint of polymerization operability, a methyl group is preferable.

In the general formula (III), q is an arbitrary integer of 0 to 5, and from the viewpoint of improving the physical properties at the time of heating of the obtained polymer and the flame-retardant composition, q is preferably 0 or 1, and more preferably 1.

In the method (2) for producing a polymer, the addition amount of the compound (A1) is not particularly limited. Whereas from the viewpoint of imparting more sufficient flame retardancy to the polymer and the flame-retardant composition, when the total amount of the raw materials is 100 parts by mass, the addition amount of the compound (A1) is preferably 0.1 parts by mass or more, more preferably 3.0 parts by mass or more, may be 10 parts by mass or more, and may be 20 parts by mass or more. The upper limit of the addition amount of the compound (A1) is not particularly limited. Whereas from the viewpoint of molding processability, when the total amount of the raw materials is 100 parts by mass, the addition amount of the compound (A1) is preferably 50 parts by mass or less, more preferably 40 parts by mass or less, and still more preferably 30 parts by mass or less.

The preferred embodiment of the addition amount of the compound (A1) can be read as a preferred embodiment of the content of the compound (A1) with respect to 100 parts by mass of the total amount of the raw material composition.

(Polymerizable Monomer (B))

In the method (2) for producing a polymer, the polymerizable monomer (B) to be used is the same as the polymerizable monomer (B) described above, and redundant description is omitted here.

(Phosphorous Acid-Based Ester Compound (C))

Examples of the phosphinous acid ester compound include diphenylphosphine oxide, diethylphosphine oxide, and dibutylphosphine oxide.

Examples of the phosphonous acid monoester compound include ethyl phenyl phosphinate, butyl phenyl phosphinate, phenyl phenyl phosphinate, and 9,10-dihydro-9-oxa-10-phosphaphenanthrene-10-oxide.

Examples of the phosphorous acid diester compound include diethyl phosphite, diisopropyl phosphite, dibutyl phosphite, 1,3-dioxa-2-phosphacyclohexane-2-oxide, 1,3-dioxa-5,5-dimethyl-2-phosphacyclohexane-2-oxide, diphenyl phosphite, bis(2,4-dimethyl)phenyl phosphite, and 1,2,3,4-tetrahydro-1,3-dioxa-2-phosphanaphthalene-2-oxide.

These phosphorous acid-based ester compounds (C) may be used alone, or two or more thereof may be used in combination.

Among these, as the phosphorous acid-based ester compound (C), diethyl phosphite, dibutyl phosphite, diphenyl phosphite, and 9,10-dihydro-9-oxa-10-phosphaphenanthrene-10-oxide are preferable, and diethyl phosphite, dibutyl phosphite, and 9,10-dihydro-9-oxa-10-phosphaphenanthrene-10-oxide are more preferable, from the viewpoint of raw material mixing property and flame retardancy.

The addition amount of the phosphorous acid-based ester compound (C) is not particularly limited. Whereas from the viewpoint of imparting more sufficient flame retardancy to the polymer and the flame-retardant composition, when the total amount of the raw materials is 100 parts by mass, the addition amount of the phosphorous acid-based ester compound (C) is preferably 0.1 parts by mass or more, more preferably 3.0 parts by mass or more, may be 10 parts by mass or more, and may be 15 parts by mass or more. The upper limit of the addition amount of the phosphorous acid-based ester compound (C) is not particularly limited. On the other hand, from the viewpoint of molding processability, when the total amount of the raw materials is 100 parts by mass, the addition amount of the phosphorous acid-based ester compound (C) is preferably 30 parts by mass or less, and more preferably 25 parts by mass or less.

The preferred embodiment of the addition amount of the phosphorous acid-based ester compound (C) can be read as a preferred embodiment of the content of the phosphorous acid-based ester compound (C) with respect to 100 parts by mass of the total amount of the raw material composition.

In addition, the addition amount of the phosphorous acid-based ester compound (C) with respect to 100 mol % of the compound (A1) is not particularly limited. Whereas from the viewpoint of further improving the flame retardancy, the addition amount is preferably 40 mol % or more, more preferably 60 mol % or more, and still more preferably 90 mol % or more. Whereas from the viewpoint of easily achieving both the improvement of the flame retardancy and the avoidance of elution and bleeding of the phosphorous acid-based ester compound (C), the addition amount of the phosphorous acid-based ester compound (C) with respect to 100 mol % of the compound (A1) is preferably 160 mol % or less, more preferably 130 mol % or less, and still more preferably 110 mol % or less.

The preferred embodiment of the addition amount of the phosphorous acid-based ester compound (C) with respect to 100 mol % of the compound (A1) can be read as a preferred embodiment of the content of the phosphorous acid-based ester compound (C) with respect to 100 mol % of the compound (A1) in the raw material composition.

(Radical Polymerization Initiator (D))

In the method (2) for producing a polymer, a radical polymerization initiator (D) may be used. The type of the radical polymerization initiator (D) is not particularly limited, and can be appropriately selected depending on the types of the compound (A1), the polymerizable monomer (B), and the phosphorous acid-based ester compound (C) to be used. Examples of the radical polymerization initiator (D) include a thermal radical polymerization initiator which generates a radical by heat, and a photoradical polymerization initiator which generates a radical by light.

Examples of the thermal radical polymerization initiator include organic peroxides such as azo compounds such as 2,2'-azobisisobutyronitrile (AIBN) and 2,2'-azobis(2,4-dimethylvaleronitrile) (ADVN); diacyl peroxides such as benzoyl peroxide; peroxyesters such as t-butyl peroxybenzoate; hydroperoxides such as cumene hydroperoxide; dialkyl peroxides such as dicumyl peroxide; ketone peroxides such as methyl ethyl ketone peroxide and acetylacetone peroxide; peroxyketals; alkyl peresters; and percarbonates.

As the photoradical polymerization initiator, a commercially available product can be used. Examples thereof include Irgacure (registered trademark, the same applies hereinafter) 651, Irgacure 184, Irgacure 2959, Irgacure 127, Irgacure 907, Irgacure 369, Irgacure 379, Irgacure 819, Irgacure 784, Irgacure OXE01, Irgacure OXE02, and Irgacure 754 (all manufactured by BASF Corp oration).

As the radical polymerization initiator (D), one type may be used alone, or two or more types may be used in combination.

The addition amount of the radical polymerization initiator (D) is not particularly limited, but in order to obtain a polymer having a sufficient degree of polymerization, when the total amount of the raw materials is 100 parts by mass, the addition amount is preferably 0.001 parts by mass or more, and more preferably 0.001 parts by mass or more and 3 parts by mass or less.

The method (2) for producing a polymer may be carried out using a mold. By carrying out polymerization and curing using a mold, the shape of the mold can be imparted to the polymer, and as a result, a cured product of the polymer having excellent flame retardancy can be obtained. Examples of the mold include a mold composed of a pair of plate-like bodies of a reinforced glass, a chrome-plated plate, a stainless steel plate or the like and a gasket of a soft vinyl chloride resin or the like, and a mold composed of opposed surfaces of a pair of endless belts that travel in the same direction at the same speed and gaskets that travel at the same speed as both endless belts on both side portions thereof.

Further, by injecting a composition to which various additives that can be used for the flame-retardant composition described later are added in addition to the raw material composition of the polymer into the mold, a cured product of a flame-retardant composition comprising a polymer can be obtained in a state in which the shape of the mold is imparted.

The polymerization temperature is preferably set to two stages of primary curing of 40 to 90° C. and subsequent secondary curing of 110 to 140° C. from the viewpoint of enhancing transparency and polymerization rate.

<Flame-Retardant Composition>

The flame-retardant composition of the present embodiment comprises a polymer including a structural unit represented by the above-mentioned general formula (I). Since phosphorus atoms are contained in the molecular structure of the polymer, elution, bleeding, or the like of the phosphorus-containing component due to heating does not occur, and the flame-retardant composition can maintain good flame retardancy.

The proportion of the polymer contained in the flame-retardant composition is not particularly limited, but is preferably 0.1 parts by mass or more, and more preferably 1.0 parts by mass or more, with respect to 100 parts by mass of the flame-retardant composition, from the viewpoint of flame retardancy. The upper limit of the proportion of the polymer contained in the flame-retardant composition is not particularly limited, but in consideration of molding processability, it is preferably 50 parts by mass or less, and more preferably 30 parts by mass or less.

(Various Additives)

The flame-retardant composition may comprise various additives such as a diluent, a pigment, a dye, a filler, an ultraviolet absorber, a viscosity improver, a shrinkage reducing agent, an aging inhibitor, a plasticizer, an aggregate, a flame retardant, a stabilizer, a fiber reinforcement, an antioxidant, a leveling agent, and an anti-sagging agent.

<Use>

The use of the polymer and the flame-retardant composition of the present embodiment is not particularly limited, but they can be suitably used for a sheet, a polymer plate, a molded plate, a coating, a pressure-sensitive adhesive, an adhesive, and the like having particularly flame retardancy.

As a preferred embodiment in which the polymer and the flame-retardant composition of the present embodiment are used, a flame-retardant sheet or a flame-retardant plate may be mentioned. A flame-retardant sheet or a flame-retardant plate obtained by using the polymer and the flame-retardant composition is excellent in that it does not contain harmful halogen atoms and is less likely to cause deterioration in physical properties such as dripping at the time of heating.

The flame-retardant sheet and the flame-retardant plate can be processed into an arbitrary three dimensional shape by secondary molding of a known method. Examples of the secondary molding method include vacuum molding and air-pressure molding.

After the flame-retardant sheet or the flame-retardant plate is heated in advance to an appropriate temperature using a heating furnace or the like, the flame-retardant sheet or the flame-retardant plate can be processed into a desired shape by being made to conform to a mold using vacuum, compression, air, mechanical pressure, or a combination thereof.

EXAMPLES

Hereinafter, the present invention will be described in detail with reference to Examples, but the present invention is not limited to these Examples.

Synthesis 1 of Compound (A)

Each compound represented by the following reaction formula was synthesized by the synthesis methods of [Production Example 1] to [Production Example 4] and [Example 1] to synthesize as the compound (A) represented by the general formula (II), a compound represented by Chemical Formula A2 in the following reaction formula.

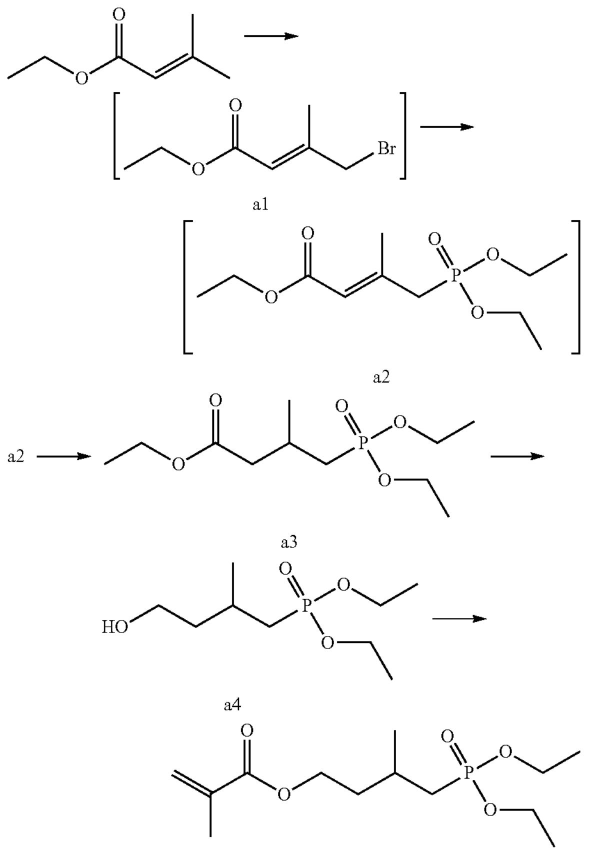

a1 a2 a2 a3 a4

A2

[Production Example 1] Synthesis of Compound (a1)

To a nitrogen-purged four-neck flask, 19.23 g (150.0 mmol) of ethyl 3-methyl-2-butenoate and 150 mL of carbon tetrachloride were added, and the mixture was heated under reflux. To the mixture, 29.3 g (165.0 mmol) of N-bromosuccinimide and 126 mg (0.75 mmol) of azobisisobutyronitrile were added, and the mixture was stirred for 30 minutes. An additional 126 mg of azobisisobutyronitrile was added, and the mixture was further stirred for 30 minutes and then cooled. The insoluble matter was filtered off, and the obtained reaction solution was concentrated to obtain a solution containing a compound (a1).

[Production Example 2] Synthesis of Compound (a2)

A concentrate solution containing the compound (a1) obtained in Production Example 1 (150.0 mmol in terms of the compound (a1)) was added to a nitrogen-purged four-neck flask, and the concentrate was dissolved in 75 mL of toluene. 38.9 mL (225.0 mmol) of triethyl phosphite was added, and the mixture was stirred at 95° C. for 12 hours. The obtained reaction solution was concentrated and purified by silica gel column chromatography to obtain 14.7 g (55.7 mmol, 37.1 mol %) of a compound (a2).

[Production Example 3] Synthesis of Compound (a3)

To a nitrogen-purged four-neck flask, 14.6 g (55.2 mmol) of the compound (a2) obtained in Production Example 2 and 80 mL of ethanol were added and dissolved. 2.9 g of 20% Pd/C catalyst was added, the inside of the flask was purged with a hydrogen atmosphere, and the mixture was stirred for 12 hours. The obtained reaction solution was filtered through Celite and purified by silica gel column chromatography to obtain 13.7 g (51.9 mmol, 93.2 mol %) of a compound (a3).

[Production Example 4] Synthesis of Compound (a4)

To a nitrogen-purged four-neck flask, 17.4 g (65.3 mmol) of the compound (a3) obtained in Production Example 3, 330 mL of dichloromethane, and 295 mL (295 mmol) of a 1M diisobutylaluminum hydride solution were added and dissolved. 50 mL of water and 35 mL of 6M HCl were added, and the mixture was stirred at 30° C. or lower. An additional 35 mL of 6M HCl was added. The organic layer was separated, extracted with ethyl acetate, and then dried over sodium sulfate. The organic layer was purified by silica gel column chromatography to obtain 12.6 g of an oily product.

The inside of the flask was purged with a nitrogen atmosphere, and the oily product was dissolved in 40 mL of methanol and 40 mL of tetrahydrofuran, stirred at room temperature (25° C.), and then 3.6 mL of glacial acetic acid was added. The reaction solution was concentrated and extracted with dichloromethane. The obtained residue was purified by silica gel column chromatography to obtain 10.7 g (42.9 mmol, 65.7 mol %) of a compound (a4).

[Example 1] Synthesis of Compound (A)

To a nitrogen-purged four-neck flask, 9.0 g (40.0 mmol) of the compound (a4) obtained in Production Example 4, 80 mL of dichloromethane, 25.1 mL (180 mmol) of diisopropylethylamine, and 15.6 mL (180 mmol) of methacrylic acid chloride were added, and the mixture was stirred at room temperature (25° C.) for 2 hours. 40 mL of a 1M aqueous solution of citric acid and 80 mL of ethyl acetate were added to the reaction solution, and the organic layer was extracted. The organic layer was dried over sodium sulfate and then purified by silica gel column chromatography to obtain 7.0 g (65.7 mol %) of a compound (A) represented by Chemical Formula A2.

Synthesis 2 of Compound (A)

Each compound represented by the following reaction formula was synthesized by the synthesis methods of [Production Example 5] and [Example 2] to synthesize a compound (A) represented by the general formula (II) (a compound represented by Chemical Formula A3 in the following reaction formula).

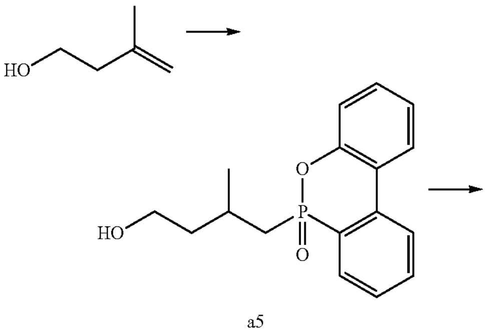

a5

-continued

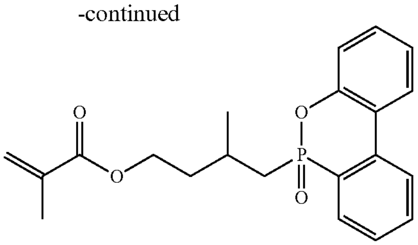

A3

[Production Example 5] Synthesis of Compound (a5)

To a nitrogen-purged four-neck flask, 500 g of toluene, 29.9 g (347 mmol) of 3-methyl-3-buten-1-ol, 79.1 g (364 mmol) of 9,10-dihydro-9-oxa-10-phosphaphenanthrene-10-oxide, and 3.75 g (17.3 mmol) of Perbutyl (registered trademark) 0 (manufactured by NOF Corporation) were added, the temperature was raised to 95° C., and the mixture was heated and stirred for 3.5 hours. After cooling, the obtained reaction solution was concentrated to obtain 159.7 g of a solution containing a compound (a5).

[Example 2] Synthesis of Compound (A)

To a nitrogen-purged four-neck flask, 159.7 g of a solution containing the compound (a5) obtained in Production Example 5, 500 g of acetonitrile, and 58.1 g (575 mmol) of triethylamine were added. The mixture was cooled in an ice-bath, 44.1 g (418 mmol) of methacrylic acid chloride was added dropwise at a rate capable of controlling the reaction temperature within a range of 5° C. to 8° C., and after the completion of the dropwise addition, the mixture was stirred at room temperature for 2 hours. 200 g of ion-exchange water and 0.4 g (3.3 mmol) of 4-dimethylaminopyridine were added to the reaction solution, and the organic layer was extracted with ethyl acetate. The organic layer was dried over sodium sulfate and then purified by silica gel column chromatography to obtain 118.0 g (319 mmol, 91.8 mol %) of a compound (A) represented by Chemical Formula A3.

<Preparation of Polymer Plate and Test Piece>

[Examples 3 to 11] and [Comparative Examples 1 and 2]

A mixture of the raw materials in Table 1 was added to a beaker containing a stirrer, and stirred until completely dissolved to obtain a raw material composition (raw material solution). The raw material solution was injected into a cell composed of two stainless steel plates (2 mm thick, 20 cm square) and a gasket made of a vinyl chloride resin, and was polymerized in a hot water bath at 60° C. for 6 hours and then in an oven at 130° C. for 2 hours, thereby obtaining a sheet having a thickness of 3.2 mm.

A test piece having a length of 127 mm×a width of 13 mm×a thickness of 3.2 mm was cut out from the obtained sheet. Using the test piece, the following combustion test was performed and evaluated. The obtained evaluation results of the combustion test are shown in Table 1.

Examples 3 and 10 are examples in which the above-mentioned polymer production method (1) was employed, and Examples 4 to 9 and 11 are examples in which the above-mentioned polymer production method (2) was employed.

<Evaluation (Combustion Test)>

[Combustion Rate]

A test piece having a thickness of 3.2 mm was allowed to stand in an environment of 23° C. and 50% RH for 18 hours. In accordance with JIS K 6911:1995 A test, a horizontally held test piece was subjected to indirect flaming with a burner for 30 seconds. The average value of three test pieces was taken, and the flame retardancy was evaluated by the rate of combustion (mm/second) of each test piece. As for the combustion rate, the smaller the numerical value, the more excellent the flame retardancy.

[Drip Test]

In the above-described combustion rate test, it was determined whether or not dripping occurs from the test piece during combustion and the drip falls. If dripping does not occur or drips do not fall, it was evaluated as "A", and if drips fall, it was evaluated as "B".

[Bleed Out]

The surface of the test piece prepared as described above was observed, and the presence or absence of bleed out (elution, bleeding) of the phosphorus-containing component was determined by visual observation and tactile sense. If the bleed out could not be confirmed, it was evaluated as "No", and if it could be confirmed, it was evaluated as "Yes".

[Flame-Retardant Carbonized Layer]

The test piece after the completion of the combustion test was visually observed, and when the formation of a black flame-retardant carbonized layer due to the phosphorus-containing component was confirmed, it was evaluated as "Yes", and when it was not confirmed, it was evaluated as "No".

TABLE 1

| | | | | Example | | | | | | | | | Comparative Example | |
|---|---|---|---|---|---|---|---|---|---|---|---|---|---|---|
| | | | | 3 | 4 | 5 | 6 | 7 | 8 | 9 | 10 | 11 | 1 | 2 |
| Raw material | Compound (A) | Chemical Formula A2 | g | 6 | | | | | | | | | | |
| | | Chemical Formula A3 | g | | | | | | | | 9 | | | |
| | Compound (A1) | | g | | 7.46 | 3.74 | 22.39 | 7.50 | 7.50 | 20.01 | | 14.00 | 8.00 | |
| | Polymerizable monomer (B) | MMA | g | 65 | 70 | 74 | 60 | 70 | 70 | 42 | 56 | 49 | 75 | 80 |
| | Phosphorous acid-based ester compound (C) | DOPO | g | | 5.20 | 5.20 | 5.19 | | | | | | | 5.00 |
| | | Diethyl phosphite | g | | | | | 3.24 | | 18.00 | | 18.00 | | |
| | | Dibutyl phosphite | g | | | | | | 4.63 | | | | | |
| | Radical polymerization initiator (D) | V-65 | mg | 61 | 69 | 69 | 69 | 67 | 65 | 57 | 56 | 58 | 70 | 69 |
| | | PerHexa C | mg | 20 | 21 | 21 | 21 | 26 | 25 | 1154 | 21 | 1167 | 22 | 25 |
| Addition amount of compound (C) with respect to 100 mol % of compound (A1) | | | mol % | — | 50 | 100 | 17 | 48 | 49 | 100 | — | 143 | — | — |
| Evaluation | Combustion rate | | mm/sec | 0.26 | 0.38 | 0.20 | 0.51 | 0.48 | 0.45 | 0.14 | 0.24 | 0.09 | 0.58 | 0.34 |
| | Drip test | | | A | A | A | A | A | A | A | A | A | A | B |
| | Bleed out | | | No | No | No | No | No | No | No | No | No | No | No |
| | Flame-retardant carbonized layer | | | Yes | Yes | Yes | Yes | Yes | Yes | Yes | Yes | Yes | No | Yes |

<Raw Material>

The raw materials in Table 1 are as follows.

<Compound (A)>

Chemical Formula A2: Compound represented by Chemical Formula A2 obtained by the synthesis methods of [Production Example 1] to [Production Example 4] and [Example 1]

Chemical Formula A3: Compound represented by Chemical Formula A3 obtained by the synthesis methods of [Production Example 5] and [Example 2]

<Compound (A1)>

3-Methyl-3-butenyl methacrylate (manufactured by Kuraray Co., Ltd.)

<Polymerizable Monomer (B)>

MMA: methyl methacrylate (manufactured by Kuraray Co., Ltd.)

<Phosphorous Acid-Based Ester Compound (C)>

DOPO: 9,10-dihydro-9-oxa-10-phosphaphenanthrene-10-oxide (manufactured by Tokyo Chemical Industry Co., Ltd.)

Diethyl phosphite: diethyl phosphite (manufactured by FUJIFILM Wako Pure Chemical Corporation)

Dibutyl phosphite: dibutyl phosphite (manufactured by FUJIFILM Wako Pure Chemical Corporation)

<Radical Polymerization Initiator (D)>

V-65: 2,2'-azobis(2,4-dimethylvaleronitrile) (manufactured by FUJIFILM Wako Pure Chemical Corporation)

PerHexa (registered trademark) C: 1,1-di(tert-butylperoxy)cyclohexane (manufactured by NOF Corporation)

From Examples 3 and 10 in Table 1, the sheet using the polymer including the structural unit represented by the general formula (I) had a low combustion rate, did not cause dripping, had a flame-retardant carbonized layer on the surface, and bleed-out was not confirmed. Thus, it can be seen that Examples 3 and 10 exhibit excellent flame retardancy.

Further, as in Examples 4 to 9, and 11, the polymers produced by the polymer production method (2) also exhibited excellent flame retardancy as in Examples 3 and 10.

On the other hand, the sheet of Comparative Example 1 using a polymer not including the structural unit represented by the general formula (I) had a high combustion rate, and in addition, no flame-retardant carbonized layer was confirmed. In addition, in the sheet of Comparative Example 2 using the polymer not including the structural unit represented by the general formula (I), the drip fell. As described above, in Comparative Examples 1 and 2, excellent flame retardancy did not be exhibited.

INDUSTRIAL APPLICABILITY

The polymer of the present invention is excellent in flame retardancy and hardly causes deterioration in physical properties such as softening at the time of heating. Therefore, the polymer of the present invention and the flame-retardant composition comprising the polymer can be used for applications requiring flame retardancy, and in particular, can be suitably applied to a flame-retardant sheet, a flame-retardant plate, a flame-retardant paint and a flame-retardant coating, a flame-retardant pressure-sensitive adhesive, a flame-retardant adhesive, a flame-retardant fiber, and the like.

The invention claimed is:

1. A polymer comprising a structural unit represented by the following general formula (I):

(I)

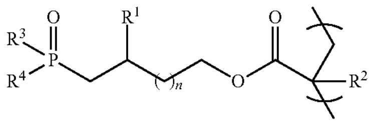

wherein, $R^1$ represents a methyl group; $R^2$ represents a hydrogen atom or a methyl group; $R^3$ and $R^4$ each independently represent any one selected from the group consisting of an alkyl group having 1 to 6 carbon atoms, an alkyloxy group having 1 to 6 carbon atoms, an alkenyl group having 2 to 6 carbon atoms, an alkenyloxy group having 2 to 6 carbon atoms, an aralkyl group having 7 to 12 carbon atoms, an aralkyloxy group having 7 to 12 carbon atoms, an aryl group having 6 to 12 carbon atoms, and an aryloxy group having 6 to 12 carbon atoms, and $R^3$ and $R^4$ may be bonded to each other; and n is 1.

2. A compound represented by the following general formula (II):

(II)

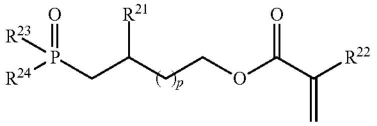

wherein, $R^{21}$ represents a methyl group; $R^{22}$ represents a hydrogen atom or a methyl group; $R^{23}$ and $R^{24}$ each independently represent any one selected from the group consisting of an alkyl group having 1 to 6 carbon atoms, an alkyloxy group having 1 to 6 carbon atoms, an alkenyl group having 2 to 6 carbon atoms, an alkenyloxy group having 2 to 6 carbon atoms, an aralkyl group having 7 to 12 carbon atoms, an aralkyloxy group having 7 to 12 carbon atoms, an aryl group having 6 to 12 carbon atoms, and an aryloxy group having 6 to 12 carbon atoms, and R 23 and $R^{24}$ may be bonded to each other; and p is 1.

3. A flame-retardant composition comprising the polymer according to claim 1.

4. A flame-retardant sheet or flame-retardant plate obtained by using the polymer according to claim 1.

5. A method for producing a polymer, comprising polymerizing a compound (A1) represented by the following general formula (III) and a polymerizable monomer (B) in the presence of at least one phosphorous acid-based ester compound (C) selected from the group consisting of a phosphinous acid ester compound, a phosphonous acid monoester compound, and a phosphorous acid diester compound:

(III)

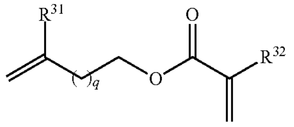

wherein, $R^{31}$ represents a methyl group, $R^{32}$ represents a hydrogen atom or a methyl group, and q is 1.

6. The method for producing a polymer according to claim 5, wherein an addition amount of the phosphorous acid-based ester compound (C) is 40 to 160 mol % with respect to 100 mol % of the compound (A1).

7. A composition comprising a compound (A1) represented by the following general formula (III), a polymerizable monomer (B), and at least one phosphorous acid-based ester compound (C) selected from the group consisting of a phosphinous acid ester compound, a phosphonous acid monoester compound, and a phosphorous acid diester compound:

(III)

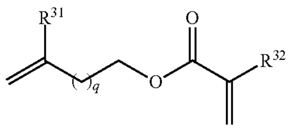

wherein, $R^{31}$ represents a methyl group, $R^{32}$ represents a hydrogen atom or a methyl group, and q is 1.

8. The composition according to claim 7, wherein a content of the phosphorous acid-based ester compound (C) is 40 to 160 mol % with respect to 100 mol % of the compound (A1).

* * * * *